Patented Aug. 18, 1936

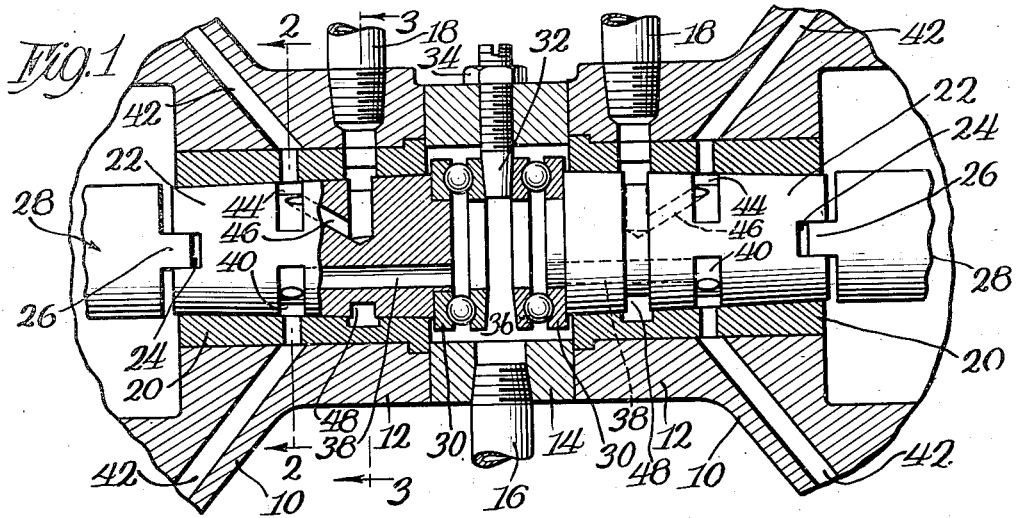
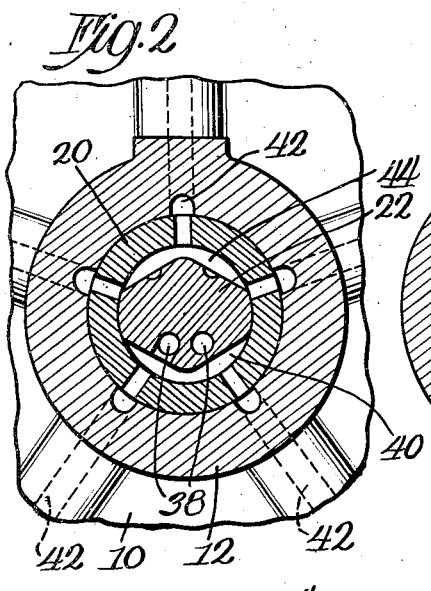
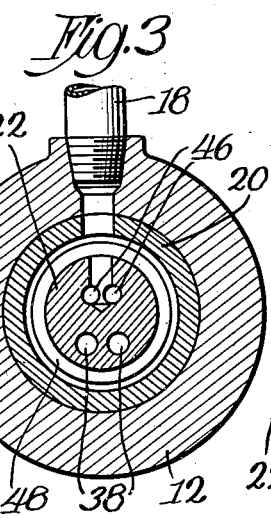
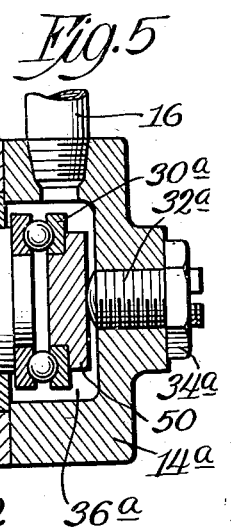
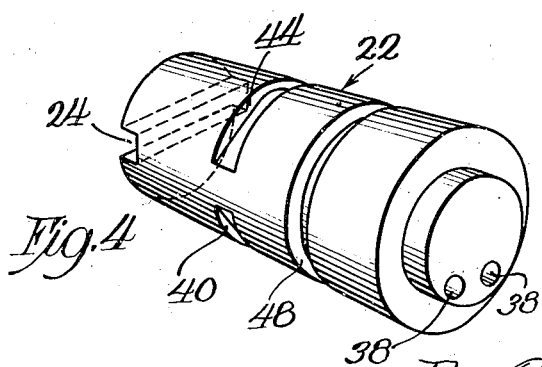
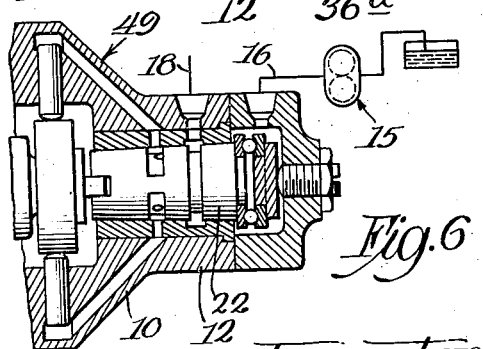
Inventor
Ernest J. Svenson
By Cheever, Cox & Moore Attys.

2,051,278

UNITED STATES PATENT OFFICE 2,051,278

VALVE CONSTRUCTION

Ernest J. Svenson, Rockford, Ill.

Application February 24, 1930, Serial No. 430,866

15 Claims. (Cl. 251—91)

My present invention relates generally to fluid control means, and particularly to fluid control valves of the rotary type.

Serious difficulties resulting from fluid slippage have been experienced in using conventional types of rotary valves. These difficulties have been particularly noticeable in connection with the operation of high pressure fluid pumps as, for example, variable displacement pumps of the rotary plunger type, wherein a central valve or pintle is employed to control fluid under high pressure. In fact, considerable slippage or leakage of high pressure fluid along the surface of these conventional types of rotary valves has been experienced, with the result that the fluid becomes overheated and the fluid propelling efficiency of the pumping mechanism is materially decreased.

My present invention contemplates the provision of a rotary valve arrangement of improved practical construction, which may be employed to direct fluid under pressure in such a manner as to prevent said fluid from slipping or leaking through the valve fittings, and my improved construction has a broad application in connection with fluid control and is not in any sense limited for use with plunger pumps and the like.

It is an object of my present invention to provide an improved practical valve construction, which may be seated within a fluid conducting structure, said structure and valve being relatively rotatable, and to this end I propose to so arrange the valve fitting that one extremity thereof will be positively sealed against fluid leakage.

More specifically, it is an object of my invention to provide a valve as above set forth, which is of a tapered construction, whereby fluid which may be present between the valve and its bearing will be constantly urged toward the larger extremity of the valve.

A further object is to provide an anti-friction thrust bearing at one extremity of said valve, and adjustment means for adjusting the valve longitudinally within its bearing.

Another object is to provide a rotary valve as above set forth which may be detachably coupled with a driving means at one extremity thereof in such a manner as to prevent side thrusts from being imparted to said valve.

Still another object of my present invention is to provide a bearing structure in which oil or other fluid under pressure may be introduced between the surfaces of the bearing elements in such a manner as to maintain a fluid film between the surfaces of said elements, and to allow said film to move slowly toward one end of the bearing, thereby preventing deterioration in the lubricating qualities of the fluid.

In order to maintain the above mentioned fluid film, I propose to provide a bearing construction which comprises a tapered member mounted within a companion apertured bearing member, said members being arranged to receive fluid under pressure, the pressure of the fluid serving to maintain spaced relation between said members, the tapered disposition of the parts being such as to present a larger annular space between said parts at one end thereof, toward which the fluid moves slowly in response to relative rotation between the parts.

These and numerous other objects and advantages will be more apparent from the following detailed description when considered in connection with the accompanying drawing, wherein—

Figure 1 discloses a longitudinal central sectional view of a valve construction which is representative of one embodiment of my invention;

Figure 2 is a transverse vertical sectional view taken substantially along the line 2—2 of Figure 1;

Figure 3 is a similar transverse sectional view taken along the line 3—3 of Figure 1;

Figure 4 is a perspective view of a detached rotary valve member;

Figure 5 is a central sectional view disclosing the manner in which a single valve member may be secured against longitudinal displacement; and Figure 6 is a diagrammatic illustration of the bearing or valve arrangement disclosed in combination with fluid pumping mechanisms.

Referring now to the drawing more in detail wherein like numerals have been employed to designate similar parts throughout the various figures, it will be seen that for the purpose of illustrating one practical application of my invention, I have shown the same in association with fragmentary portions of a pump mechanism, which simulates the pump structure shown in my below mentioned co-pending application.

In Figure 1 of the drawing I have shown a double valve arrangement in which a pair of similar pump housings 10 are arranged in axial alinement, with the bearing sections 12 thereof abutting a spacer ring 14. A pipe line 16 which is connected to the spacer ring 14 is adapted to be connected with a suitable source of fluid supply, such as a gear pump 15, shown diagrammatically in Figure 6, while pipe lines 18 in the housing sections 12 are adapted to be connected with stations to be supplied with fluid. Mounted in each section 12 is a suitable bearing or bushing 20 which provides a support or bearing for a rotary tapered valve member 22.

Each of the valve members 22 is provided with a slot 24 at the smaller extremity thereof which is adapted to receive a tongue 26 of a suitable driving member 28. The opposite extremity of each valve member supports an anti-friction thrust bearing 30, and interposed between these thrust bearings 30 is a suitable abutment or pin 32. This pin 32 is adapted to effect longitudinal adjustment of the valve members 22, and a lock nut 34 secures the threaded abutment in various positions of adjustment.

Fluid from the pipe 16 enters a chamber 36 which is presented within the spacer ring 14, and from this chamber passes through a pair of longitudinal passages 38. These passages 38 communicate at their inner extremities with a peripheral valve port 40, and this valve port 40 is adapted to communicate successively with radial passages 42 in the pump housing 10. The valve member 22 is also provided with a peripheral port 44 which is oppositely disposed from the port 40, and is also adapted to communicate successively with the passages 42 of the pump housing. Fluid from the passages 42 enters the valve port 44, and is then directed through a pair of passages 46 to an annular port 48. This annular port 48 communicates with the exhaust pipe line 18. Thus it will be apparent that fluid from the intake pipe line 16 may be directed through the passages 38 of the valve into the passages 42, and from these passages 42 the fluid may be withdrawn through the valve passages 46 and thence into the outlet pipe lines 18.

The passages 42, as shown in the drawing, communicate with a plunger pump mechanism 49, shown diagrammatically in Figure 6. Inasmuch as the present invention does not cover a specific pumping mechanism, said plunger arrangement has not been shown in detail. For a more detailed description of a pumping mechanism of the type shown in the drawing, reference is made to my co-pending application, filed February 24, 1930, Serial No. 430,867, now Patent No. 1,989,117, granted January 29, 1935. These passages 42 serve to represent passages which may be connected to any station for receiving and discharging a fluid medium. In other words, the particular valve arrangement shown in the drawing is adaptable for use in connection with numerous types of apparatus and is not in any sense limited for use with fluid propelling devices, such as the plunger pump mechanism 49.

Attention is directed to the tapered arrangement of the valve member and its companion seat or bearing 20. By having this arrangement, the leakage or slippage of fluid toward the driven or smaller end of the valve members 22 is prevented. Any movement of fluid which might be present in the clearance space between the valve and bearing member or sleeve 20 will take place slowly toward the opposite larger end of the valve.

The slow movement of the fluid film in the clearance space between the valve and bearing member toward the larger end of the valve will be more readily apparent when it is understood that said clearance space increases in area toward the larger end of the valve. Hence, the resistance to fluid movement is less at the larger end of the valve than at the smaller end. As the fluid under pressure is directed to the tapered valve from the passages 42, said fluid pressure will urge the valve toward its larger end. Obviously, the longitudinal movement of the valve will be prevented by reason of the abutment 32, and the position of this abutment can be so adjusted as to enable the presentation of a greater or less clearance space between the valve and its companion bearing. The pressure of the fluid from the passageways 42 obviously will be greater than the pressure of the fluid within the chamber 36. It will be apparent that the taper or frusto-conical arrangement of the parts may be arranged to suit the pressure of the fluid. In other words, in some instances it might be desirable to increase the degree of taper to suit the pressure of the fluid, while in other instances it might be desirable to employ a lesser taper.

It should be clearly understood that my invention is not in any sense limited for use with a valve construction. It can be used equally well for bearing constructions, such as in spindles and the like. In such constructions the fluid may be introduced between the two surfaces of the spindle bearing at a suitable high pressure in such a manner as to present an oil film of governed thickness to prevent the two surfaces from rubbing directly against each other. The spindle construction will correspond in detail to the tapered construction of the valve just described, and the fluid will move slowly toward the larger end thereof in the manner described, thereby enabling a continuous change of lubricating medium between the bearing surfaces. Applying fluid under pressure to tapered surfaces in the manner described enables a valve or bearing member to rotate without vibration, and further maintains absolute alinement thereof. In other words, it enables an oil film under relatively high pressure to be maintained between two surfaces to prevent said surfaces from engaging each other without disturbing the alinement thereof.

By having this tapered valve construction, I am able to eliminate the heating of fluid which has been experienced heretofore in connection with the use of conventional types of cylindrical rotary valves wherein fluid under pressure is forced through the clearance space presented along the valve surface. The leakage or slippage of fluid which has been experienced, not only causes the temperature of the fluid to be increased beyond a reasonable limit, but also greatly reduces the efficiency of the mechanism with which the valve is associated, because fluid which should be employed for propelling or activating purposes is being wasted as a result of the leakage through the valve fitting. My improved construction is extremely simple and yet has proven very practical and efficiently operable not only as a means for directing fluid from one point to another, but also as an effective fluid sealing means, whereby fluid may be transferred between relatively rotatable parts without leakage.

In Figure 5 I have shown the manner in which a single rotary valve may be secured against longitudinal displacement. In this instance I provide an end casing member 14a which is secured in any suitable manner against the end surface of the section 12. A chamber 36a presented within the end casing 14a houses an anti-friction bearing 30a carried by the rotary valve member 22. A threaded abutment or screw 32a bears against a thrust member 50, and said abutment is secured in various positions of adjustment by means of a lock nut 34a. The anti-friction thrust bearings 30 and 30a, together with their adjustable abutment members 32 and 32a respectively, provide a very convenient and practical construction for taking up end thrusts. The valve member 22 may be conveniently adjusted by means of the mechanism just described, and the simple arrangement of this mechanism is such as to render the valve structure free from undue wear and stresses.

In addition to the above mentioned advantages, it will be seen that my invention contemplates the provision of a rotary valve mechanism which is self-contained and independently supported in the sense that the valve member is supported wholly within a tapered bearing. In other words, the mechanism for driving said valve need not in any sense support the valve. By this arrangement I am able to so couple the driving mechanism and the valve to prevent said valve from being subjected to side thrusts. This side wear or thrust is particularly noticeable in instances where the valve is coupled with an eccentrically positioned driving member. To avoid the transmission of this side thrust to the valve member I employ the tongue and groove arrangement shown in Figure 1. By this arrangement the side thrust experienced by the driving member may act in the direction of the groove or slot 24, and in this manner prevent said side thrust from being imparted to the valve member.

From the foregoing it will be apparent that my invention contemplates the provision, in combination with means for supplying fluid under varying pressures, of a bearing or valve construction which is adapted to receive the fluid under the higher pressure between the adjacent surfaces of the bearing or valve elements, and to receive the fluid at the lower pressure at one extremity of said parts. By this arrangement the proper positioning of a fluid film between the valve or bearing parts is maintained, and the fluid moves slowly toward one end in accordance with the adjusted arrangement or disposition of the parts.

Having thus described my invention, what I claim as new and desire to secure by Letters Patent is:

1. A valve construction including a pair of bearing sections providing valve seats, a tapered valve member rotatable in each of said seats, the larger extremities of said valve members terminating at the adjacent portions of said bearing sections, a non-yieldable thrust bearing at the adjacent extremities of said valve members, and adjustable abutment means for said thrust bearings.

2. In combination with fluid propelling means for supplying fluid under a given pressure and fluid propelling means for supplying fluid under a lesser pressure, a bearing device having an internal bearing surface, a tapered member mounted within said bearing device, means for directing fluid under the higher pressure from said fluid supplying means to the adjacent bearing surfaces of said parts, and means for conducting fluid from the other fluid supplying means to one extremity of said tapered member.

3. In combination with fluid propelling means for supplying fluid under a given pressure and fluid propelling means for supplying fluid under a lesser pressure, a bearing device having an internal tapered bearing surface, a tapered bearing member rotatably mounted within said bearing device, means for directing fluid under the higher pressure from said fluid supplying means to a point between the adjacent tapered surfaces of said parts, and means for directing fluid from the other fluid supplying means to a point adjacent the larger extremity of said rotatable member.

4. In combination with fluid propelling means for supplying fluid under a given pressure and fluid propelling means for supplying fluid under a lesser pressure, a bearing device having an internal tapered bearing surface, a tapered bearing member rotatably mounted within said bearing device, means for directing fluid under the higher pressure from said fluid supplying means to a point between the adjacent tapered surfaces of said parts, means for directing fluid from the other fluid supplying means to a point adjacent the larger extremity of said rotatable member, and means for longitudinally adjusting the rotatable member within the bearing member.

5. In combination with fluid propelling means for supplying fluid under a given pressure and fluid propelling means for supplying fluid under a lesser pressure, a bearing device having an internal tapered bearing surface, a frusto-conical valve member rotatable within said bearing device, means for conducting fluid under the higher pressure to a point between the adjacent bearing surfaces of said parts, a chamber positioned at the larger extremity of said valve member, and means for conducting fluid from the other fluid supplying means to said chamber.

6. The method of controlling the conveyance of fluid under pressure between relatively rotatable members having adjacently positioned and separable bearing surfaces, which consists in forming a fluid film between said adjacently positioned bearing surfaces, limiting the extent to which said bearing surfaces may be separated, maintaining said fluid film under pressure during said relative rotation to preserve the separation of said bearing surfaces within said restricted limits, causing fluid under pressure to be conveyed between said relatively rotating members within the confines of said fluid film under pressure, said film thus serving as a seal against leakage of the conveyed fluid along said bearing surfaces, and effecting the slow migration of said fluid film with respect to said surfaces during the relative rotation of said members to facilitate the sealing action thereof.

7. A valve construction for receiving and discharging fluid under pressure including, a tapered valve seat, a correspondingly tapered valve extending within said seat, cooperative ports in said tapered seat and valve for controlling the flow of fluid therethrough during relative rotation of said valve and seat, and means for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible throughout an operating range of fluid pressures experienced within said ports.

8. A valve construction for receiving and discharging fluid under pressure including, a tapered valve seat, a correspondingly tapered valve extending within said seat, cooperative ports in said tapered seat and valve for controlling the flow of fluid therethrough during relative rotation of said valve and seat, means for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible through an operating range of fluid pressures experienced within said ports, and fluid salvaging means associated with a larger extremity of said valve to receive fluid which moves toward said extremity.

9. A valve construction for receiving and discharging fluid under pressure including, a tapered valve seat, a correspondingly tapered valve extending within said seat, cooperative ports in said tapered seat and valve for controlling the flow of fluid therethrough during relative rotation of said valve and seat, and adjustable means for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible throughout an operating range of fluid pressures experienced within said ports, the adjustability of the securing means serving to control the degree of spacing between the complementary surfaces of the seat and valve.

10. A valve construction for receiving and discharging fluid under pressure including, a tapered valve seat, a correspondingly tapered valve extending within said seat, cooperative ports in said tapered seat and valve for controlling the flow of fluid therethrough during relative rotation of said valve and seat, and a thrust bearing cooperating with the larger extremity of the valve for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible through an operating range of fluid pressures experienced within said ports.

11. A valve construction for receiving and discharging fluid under pressure including, a tapered valve seat, a correspondingly tapered valve extending within said seat, cooperative ports in said tapered seat and valve for controlling the flow of fluid therethrough during relative rotation of said valve and seat, a fluid receiving chamber at one extremity of said valve, and means for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible throughout an operating range of fluid pressures experienced within said ports.

12. A valve construction for receiving and discharging fluid under pressure including, a tapered valve seat, a correspondingly tapered valve extending within said seat, cooperative ports in said tapered seat and valve for controlling the flow of fluid therethrough during relative rotation of said valve and seat, and anti-friction bearing means for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible through an operating range of fluid pressures experienced within said ports.

13. A valve construction for receiving and discharging fluid under pressure including, a tapered valve seat, a correspondingly tapered rotary valve extending within said seat, cooperative ports in said tapered seat and valve for controlling the flow of fluid therethrough during relative rotation of said valve, and means for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible throughout an operating range of fluid pressures experienced within said ports.

14. A valve construction for receiving and discharging fluid under pressure including, a tapered valve seat, a correspondingly tapered valve extending within said seat, cooperative ports in said tapered seat and valve for controlling the flow of fluid therethrough during relative rotation of said valve and seat, said valve having fluid conducting passages extending longitudinally thereof for communication with said ports, said passages being small enough in cross section as compared with the cross sectional area of the valve to prevent said valve from experiencing lateral distortion as a result of fluid pressure experienced within said passages, and means for securing said tapered seat and valve against relative axial displacement due to fluid pressure experienced within said ports and for enabling the complementary surfaces of said seat and valve to be spaced from each other a distance which is just sufficient to insure the presence of a fluid film and thereby maintain the volumetric migration of fluid between said complementary surfaces negligible throughout an operating range of fluid pressures experienced within said ports.

15. The method of controlling the conveyance of fluid under pressure between a pair of members having adjacently positioned relatively movable bearing surfaces which comprises forming a sealing fluid film between said surfaces, maintaining said surfaces a predetermined distance apart to preserve the film intact during relative movement of said surfaces, maintaining said fluid film under pressure, causing fluid to be conveyed between said members within the confines of said film, and effecting a slow migration of said film with respect to said surfaces to facilitate the sealing action thereof.

ERNEST J. SVENSON.